UNITED STATES PATENT OFFICE.

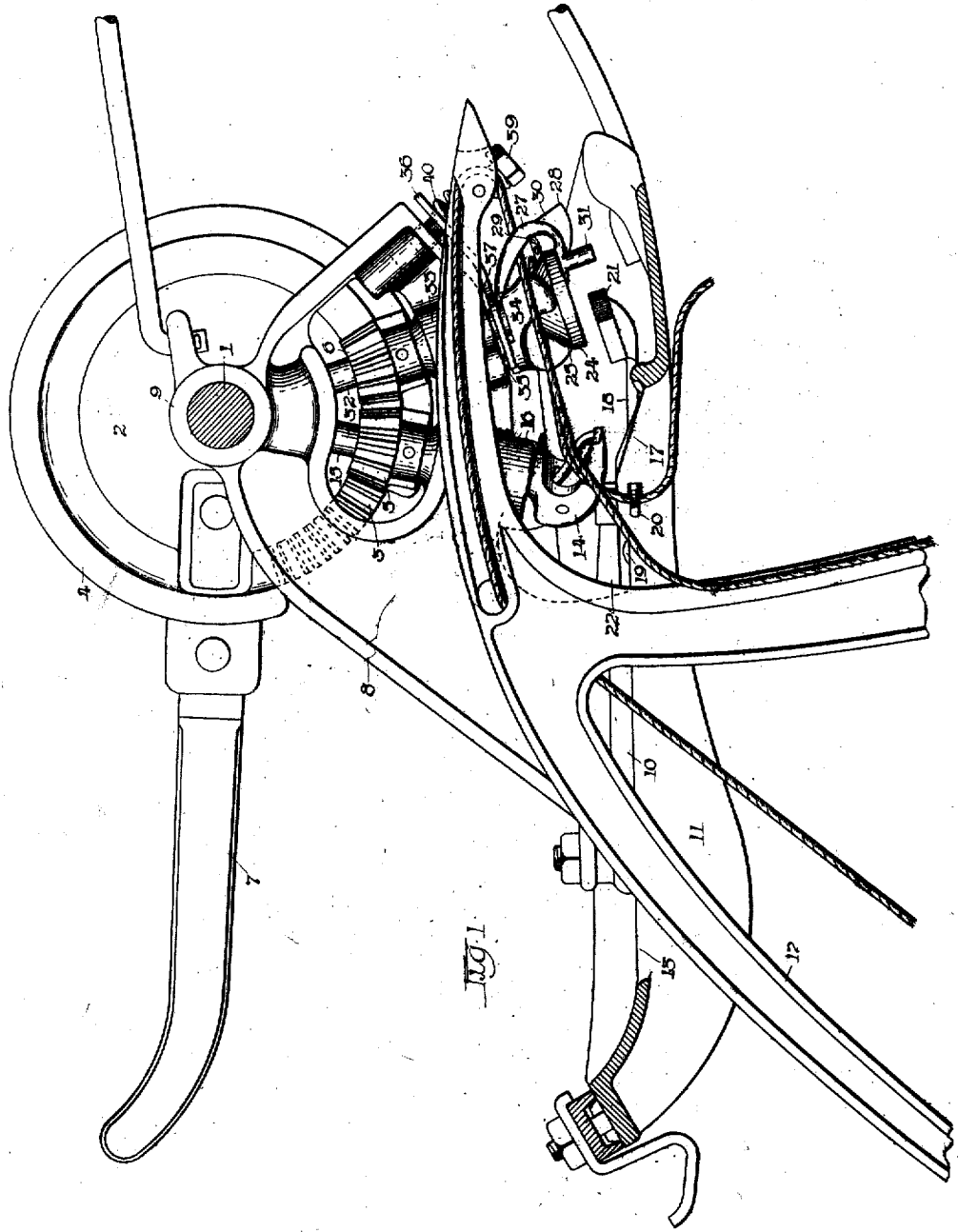

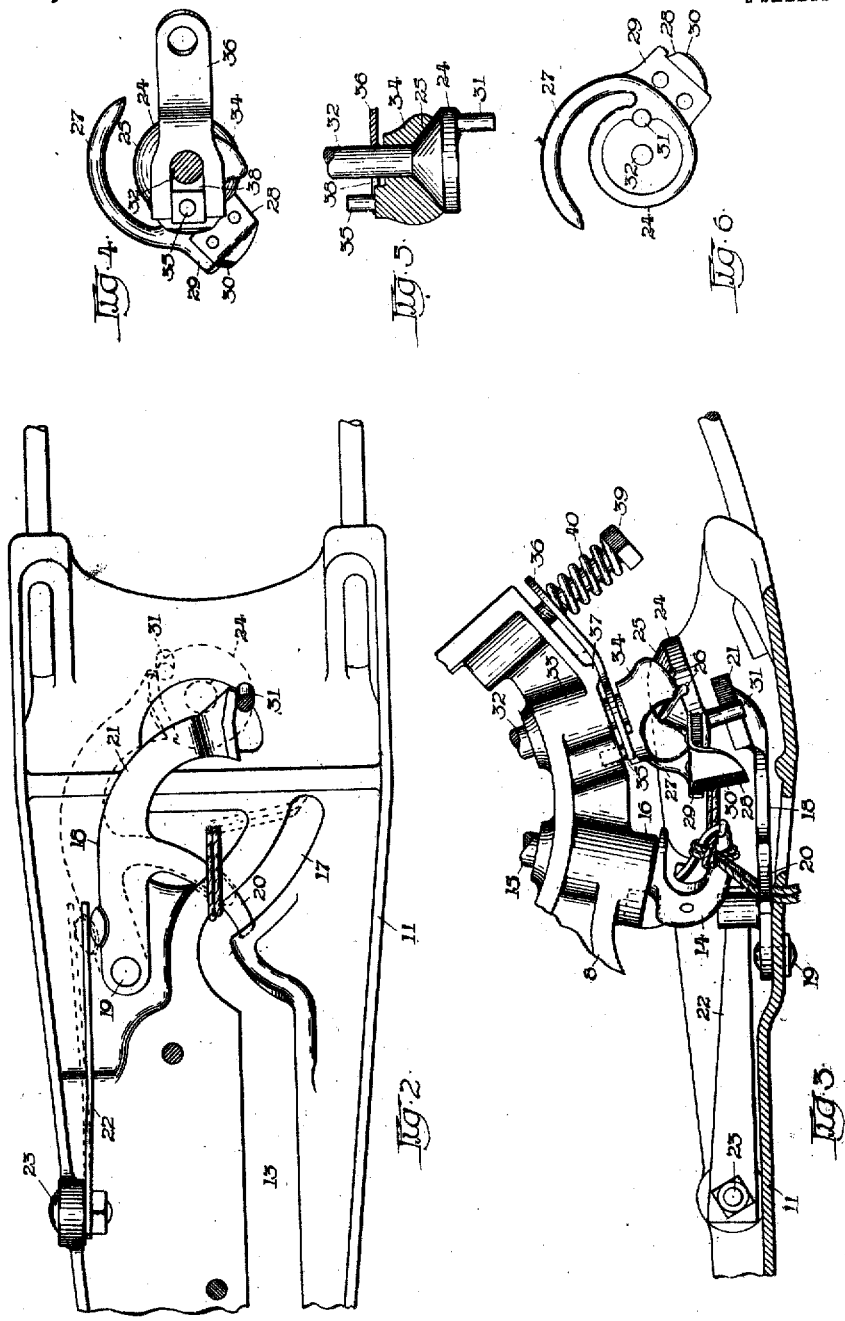

JAMES A. SHARP, OF SPRINGFIELD, OHIO, ASSIGNOR TO INTERNATIONAL HARVESTER COMPANY, A CORPORATION OF NEW JERSEY.

CORD-KNOTTER.

933,126.

Specification of Letters Patent. Patented Sept. 7, 1909.

Application filed March 29, 1909. Serial No. 486,358.

*To all whom it may concern:*

Be it known that I, JAMES A. SHARP, a citizen of the United States, residing at Springfield, in the county of Clark and State of Ohio, have invented certain new and useful Improvements in Cord-Knotters, of which the following is a specification.

My invention relates to cord knotters for grain binders, and in particular to improved means for operating the cord gate, means for severing the cord, and to improvements in the cord holding device, its object being to make the cord knotter mechanism more efficient in operation and simple in construction. This object is attained by means of the mechanism illustrated in the accompanying drawings, in which—

Figure 1 is a side elevation of a knotter mechanism having my invention forming a part thereof; Fig. 2 is a top view of a part of the breast-plate, showing the manner of mounting the cord gate and the mode of its operation; Fig. 3 is a sectional elevation of part of Fig. 1; Fig. 4 is a detail drawing representing a top view of the rotatable and non-rotatable parts of the cord holder mechanism and its pressure regulating spring; Fig. 5 is a cross section of the non-rotatable member of the cord holder mechanism, as shown in Fig. 4, and a side elevation of the rotatable member; and Fig. 6 is a bottom view of the rotatable member, showing the manner of attaching the cord cutting blade thereto.

Like reference characters designate the same parts throughout the several views.

1 designates the knotter mechanism driving shaft, 2 the cam wheel secured thereto, having the usual toothed portion 3, and a delay surface 4 for operatively engaging with the knotter actuating pinion 5 and cord holder actuating pinion 6, and 7 represents a bundle discharging arm secured to the cam wheel.

8 represents the knotter frame having a bearing 9 at its upper end in which the shaft 1 is journaled, and a base portion 10 at its lower forward end to which is secured the breast-plate 11.

12 represents the needle, and the breast-plate is provided with a longitudinally arranged slot 13 adapted to receive the needle during a part of its operative movement.

14 designates a common form of knotter hook having its shank portion 15 journaled in a bearing 16 forming part of the frame 8 and arranged in substantially a radial line relative to the axis of the shaft 1, the pinion 5 being secured to the upper end of the shaft. The knotter hook, in its initial position, trends rearward, and 17 represents a continuation of the slot 13 curving inward toward the axis of the shaft 15 and then rearward and outward beyond the path of movement of the hook and adapted to guide the cord during the operation of the knot tying mechanism, and 18 designates a cord retaining arm pivotally connected with the breast-plate by means of a pivot bolt 19; the arm being provided with a branch portion 20 adapted to be projected across the slot 13 in a manner to prevent the cord from passing therealong, and a rearwardly extending portion 21 that coacts with the cord holding mechanism in a manner to control the movement of the arm in a direction to release the cord, the plate spring 22 having one end secured to the breast-plate by means of a bolt 23 and its opposite end contacting with said cord retaining arm in a manner to move it in an opposite direction.

The cord holder includes a rotatable member 24, having a conical upper surface 25, a portion of which is provided with grooves 26 angularly arranged relative to the direction of rotation thereof; a cord engaging arm 27 integral with said member and arranged approximately concentric with the axis thereof and adapted to present the cord in proper position to be engaged by the cord holding member; a cord severing knife 28 secured to a projecting ledge 29 forming part of said member and having a downwardly extended cutting edge 30. A downwardly projecting stem 31 is eccentrically arranged relative to the axis of the said member and adapted to contact the rearwardly extending portion 21 of the cord retaining arm in a manner to swing the latter about its pivot when the rotatable member of the cord holding mechanism is turned in one direction. A shank 32 is journaled in a bearing 33, said bearing forming a part of the knotter frame 8, and arranged radially relative to the axis of the knotter driving shaft 1; the cord holder actuating pinion 6 being secured to the upper end of said shank.

34 designates a non-rotatable member of the cord holding mechanism that is loosely mounted upon the shank 32, between its bearing in the frame and the rotatable member, in a manner permitting it to move longitudinally upon the shank, and having its lower end cup-shaped in a manner to coact with the conical surface of the rotatable member in gripping the cord between the opposing surfaces of the two members, and an upwardly projecting stem 35, arranged concentric with the axis of the shank and received by an opening in the frame for the purpose of securing the member against rotation.

36 designates a plate spring, or lever, having intermediate its end a fulcrum 37 upon the frame, one end of the plate being provided with a slot 38 which loosely receives the shank 32 and a rectangular boss at the base of the stem 35, and the opposite end of the plate is provided with an opening adapted to receive the set screw 39 that is screwed into the knotter frame, preferably in a radial line relative to the axis of the knotter driving shaft, a coil spring 40 being operative between the head of the screw and the plate in a manner to yieldingly press the latter in a direction to cause its opposite end to exert a variable pressure upon the non-rotatable member of the cord holding mechanism.

In the operation of the mechanism the cord retaining arm is normally projected across the cord slot 17 by the action of the spring 22. The cord passes from the eye of the needle across the retaining arm of the holder, the mechanism not being gripped thereby, and when the needle is advanced it encircles the bundle and delivers the cord to the holder, the two strands being retained by the cord retaining arm and the cord slot in proper position for engagement with the knotter hook that in its rotative movement forms the knot in a common way; the rotatable member of the cord holding mechanism being revolved in a manner to grip the needle strand and swing the cord retaining arm beyond the path of the cord and cause the knife to sever the same when the knot is completed.

What I claim as my invention, and desire to secure by Letters Patent, is:

1. A knotter mechanism including, in combination, a rotatable cord holding member, a knotter hook, a breast-plate having a cord slot therein, a cord retaining arm, means for projecting said arm across said slot, and means coöperating with said rotatable cord holding member for moving said arm in an opposite direction.

2. A knotter mechanism including, in combination, a rotatable cord holding member, a knotter hook, a breast-plate having a cord slot therein, a cord retaining arm pivotally mounted upon said breast-plate, a spring operative to project said arm across said slot, a stem arranged upon said rotatable cord holding member eccentric to its axis and adapted to contact with said cord retaining arm in a manner to move it against the pressure of said spring.

3. A knotter mechanism including, in combination, a driving shaft, a knotter frame having said shaft journaled therein, a breast-plate secured to said frame and having a cord slot therein, a knotter hook journaled in said frame and normally extending across said slot, a cord retaining arm pivotally mounted upon said breast-plate, a spring operative to project said arm across said slot in a manner to retain the cord in proper position to be engaged by said knotter hook, a rotatable cord holding member, a shank forming part of said member and journaled in said frame, a stem projecting downward from the lower surface of said rotatable cord holding member and arranged eccentric to its axis, said cord retaining arm having a rearwardly extending portion adapted to contact with said stem during a part of the rotative movement of said rotatable cord holding member.

4. A knotter mechanism including, in combination, a driving shaft, a knotter frame having said shaft journaled therein, a breast-plate secured to said frame and having a cord slot therein, a needle, a knotter hook journaled in said frame, a cord holding mechanism, said mechanism including a shank journaled in a bearing forming part of said frame and in rear of said knotter hook, a non-rotatable cord holding member slidably mounted upon said shank adjacent said frame, an upwardly projecting stem arranged eccentrically upon said non-rotatable member and intermediate said frame in a manner to prevent rotation of said member, a rotatable cord holding member secured to the lower end of said shank and adapted to coact with said non-rotatable member in gripping the cord, a lever having a fulcrum intermediate its ends upon the said frame, one end of said lever engaging with the upper side of said non-rotatable member and having a slot therein adapted to receive said shank, the opposite end of said lever being adjustably and yieldingly connected with said frame.

5. A knotter mechanism including, in combination, a driving shaft, a knotter frame having said shaft journaled therein, a breast-plate secured to said frame and having a cord slot therein, a needle, a knotter hook journaled in said frame, a cord holding mechanism, said mechanism including a shank journaled in a bearing forming part of said frame and in rear of said knotter hook, a non-rotatable cord holding member slidably mounted upon said shank adjacent said frame, an upwardly projecting stem arranged eccentrically upon said non-rotatable member and intermediate said frame in a manner to prevent rotation of said member, an angular boss at the base of said stem, a rotatable cord holding member secured to the lower end of said shank and adapted to coact with said non-rotatable member in gripping the cord, a lever having a fulcrum intermediate its ends upon said frame, one end of said lever engaging with the upper side of said non-rotatable member and having a slot therein adapted to receive said shank and said angular boss, an opening in the opposite end of said lever, a set screw received by said opening and screwed into said frame, said set screw having a head portion and a spring operative between said head and the lever in a manner to press the latter toward the frame.

JAMES A. SHARP.

Witnesses:
W. B. KENDIG,
H. GUYTON.